(12) United States Patent
Sang et al.

(10) Patent No.: US 9,772,526 B2
(45) Date of Patent: Sep. 26, 2017

(54) FRAMELESS DISPLAY DEVICE AND METHOD OF FABRICATING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Sang, Beijing (CN); Chenru Wang, Beijing (CN); Junjie Ma, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 110 days.

(21) Appl. No.: 14/803,867

(22) Filed: Jul. 20, 2015

(65) Prior Publication Data

US 2016/0161777 A1 Jun. 9, 2016

(30) Foreign Application Priority Data

Dec. 3, 2014 (CN) .......................... 2014 1 0727422

(51) Int. Cl.
*G02F 1/1339* (2006.01)
*G02F 1/1341* (2006.01)
(Continued)

(52) U.S. Cl.
CPC ...... *G02F 1/1341* (2013.01); *G02F 1/133308* (2013.01); *G02F 2001/133325* (2013.01); *G02F 2001/133354* (2013.01)

(58) Field of Classification Search
None
See application file for complete search history.

(56) References Cited

U.S. PATENT DOCUMENTS

| 2001/0017684 | A1 | 8/2001 | Hirakata et al. |
| 2004/0104673 | A1* | 6/2004 | Hosokawa ............. H05B 33/04 313/512 |
| 2015/0211707 | A1* | 7/2015 | Watanabe ......... G02F 1/133308 345/667 |

FOREIGN PATENT DOCUMENTS

| CN | 1493173 A | 4/2004 |
| CN | 1759638 A | 4/2006 |

(Continued)

OTHER PUBLICATIONS

Office Action dated Aug. 26, 2016 issued in corresponding Chinese Application No. 201410727422.9.

*Primary Examiner* — Ashok Patel
(74) *Attorney, Agent, or Firm* — Nath, Goldberg & Meyer; Joshua B. Goldberg

(57) ABSTRACT

The present invention discloses a frameless display device and a method of fabricating the same. The frameless display device comprises a first substrate and a second substrate which are provided opposite to each other, an edge of the first substrate is coupled to an edge of the second substrate to realize frame sealing. In the technical solutions of the frameless display device and the method of fabricating the same provided by the present invention, an edge of the first substrate is coupled to an edge of the second substrate to realize frame sealing, so that frame sealing is achieved without any frame sealing adhesive, so complete frameless display is realized.

7 Claims, 6 Drawing Sheets

(51) Int. Cl.
 *G02F 1/13* (2006.01)
 *G02F 1/1333* (2006.01)

(56) References Cited

FOREIGN PATENT DOCUMENTS

| CN | 102967953 A |   | 3/2013 |
|----|-------------|---|--------|
| CN | 203149247   | * | 8/2013 |
| CN | 203149247 U |   | 8/2013 |
| WO | 2014-101463 | * | 1/2014 |

* cited by examiner

FRAMELESS DISPLAY DEVICE AND METHOD OF FABRICATING THE SAME

FIELD OF THE INVENTION

The present invention relates to the field of display technology, in particular to a frameless display device and a method of fabricating the frameless display device.

BACKGROUND OF THE INVENTION

With continuous development of the display industry, a frameless display technology is becoming an important development direction in the future display field. A traditional liquid crystal display device includes a display region and a nontransparent region, the nontransparent region is provided outside the display region, and the nontransparent region includes frame sealing adhesive for bonding a glass substrate to protect liquid crystals.

FIG. 1a is a structure diagram of a liquid crystal display device in the prior art, and FIG. 1b is a sectional view of the liquid crystal display device of FIG. 1a in a direction A-A. As shown in FIG. 1a and FIG. 1b, the liquid crystal display device includes a color filter substrate 1 and an array substrate 2 which are provided opposite to each other. Liquid crystal 3 is provided between the color filter substrate 1 and the array substrate 2. Frame sealing adhesive 4 is also provided between the color filter substrate 1 and the array substrate 2 and provided on edges of the color filter substrate 1 and the array substrate 2.

A frame sealing method of a liquid crystal display device in the prior art realizes the fitting of glass substrates and avoids the overflow of liquid crystals by using the frame sealing adhesive. Since the frame sealing adhesive generally requires a certain width to realize its function, a complete frameless display cannot be realized technologically.

SUMMARY OF THE INVENTION

The present invention provides a frameless display device and a manufacturing method thereof, which are used for realizing complete frameless display.

To achieve the above objective, the present invention provides a frameless display device, including a first substrate and a second substrate which are provided opposite to each other, an edge of the first substrate is coupled to an edge of the second substrate to realize frame sealing without any nontransparent region.

Preferably, the frameless display device further includes a transparent film, the transparent film envelops the first substrate and the second substrate so that the edge of the first substrate and the edge of the second substrate are coupled to each other by the transparent film.

Preferably, a length of the first substrate is greater than that of the second substrate, a circuit region is provided on a side edge of the first substrate in a length direction, a circuit module is provided within the circuit region, and the transparent film envelops the second substrate and is partially attached to a position other than the circuit module within the circuit region.

Preferably, the transparent film is a polyester film.

Preferably, the edge of the first substrate and the edge of the second substrate are directly coupled to each other after melting.

To achieve the above objective, the present invention further provides a method of fabricating a frameless display device, comprising steps of:

arranging a first substrate and a second substrate opposite to each other, and coupling an edge of the first substrate to an edge of the second substrate to realize frame sealing without any nontransparent region.

Preferably, the steps of arranging a first substrate and a second substrate opposite to each other, and coupling an edge of the first substrate to an edge of the second substrate to realize frame sealing comprise steps of:

placing a part of a transparent film into a jig;

placing the first substrate into the jig to allow the first substrate to be disposed on the transparent film in the jig;

instilling liquid crystals on the first substrate;

placing the second substrate into the jig, aligning the second substrate to the first substrate, and disposing the second substrate on the first substrate;

enveloping the first substrate and the second substrate by using the transparent film; and plastically sealing the transparent film so that the edge of the first substrate and the edge of the second substrate are coupled to each other by the transparent film.

Preferably, the jig comprises four side edges, one side edge is higher than other three side edges, the tops of the other three side edges correspond to the second substrate, a plastic seal during plastic sealing is located on a side edge of the second substrate.

Preferably, a length of the first substrate is greater than that of the second substrate, a circuit region is provided on a side edge of the first substrate in a length direction, and a circuit module is provided within the circuit region; and the method further comprises a step of:

enveloping the second substrate by using the transparent film and partially attaching the transparent film to a position other than the circuit module within the circuit region.

Preferably, the step of enveloping the second substrate by using the transparent film and partially attaching the transparent film to a position other than the circuit module within the circuit region comprises:

plastically sealing the transparent film corresponding to a side edge with a smaller height and without the circuit region disposed thereon.

Preferably, the manufacturing method further comprises removing a plastic seal formed by the plastic sealing.

Preferably, the steps of arranging a first substrate and a second substrate opposite to each other, and coupling an edge of the first substrate to an edge of the second substrate to realize frame sealing comprise steps of:

placing a part of a film into a jig;

placing the first substrate into the jig to allow the first substrate to be disposed on the film in the jig;

instilling liquid crystals on the first substrate;

placing the second substrate into the jig, aligning the second substrate to the first substrate, and disposing the second substrate on the first substrate;

enveloping the first substrate and the second substrate by using the film; and melting an edge of the first substrate and an edge of second substrate by laser so that the edge of the first substrate is directly coupled to the edge of the second substrate.

Preferably, in the case where the film is a nontransparent film, the method further comprises removing the film.

The present invention has the following beneficial effects:

in the technical solutions of the frameless display device and the method of fabricating the frameless display device provided by the present invention, an edge of the first substrate is coupled to an edge of the second substrate to realize frame sealing without any nontransparent region, so that frame sealing is achieved without any frame sealing adhesive, and complete frameless display is realized.

DESCRIPTION OF THE PREFERRED EMBODIMENT

To make those skilled in the art better understand the technical solutions of the present invention, the frameless display device and the method of fabricating the frameless display device provided by the present invention will be described below in detail with reference to the accompanying drawings.

Figure 1A:
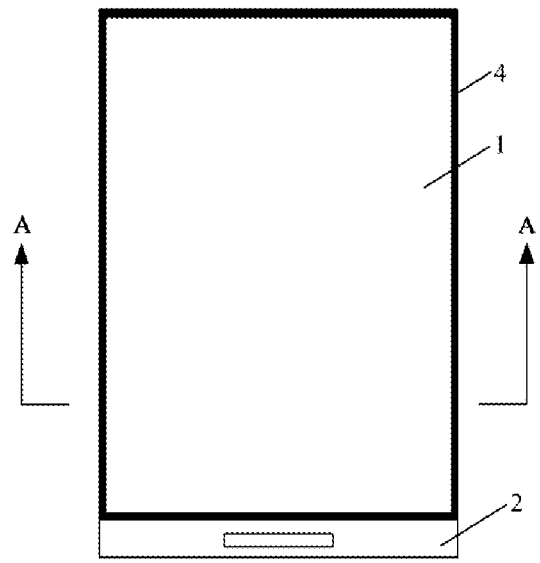
FIG. 1a is a structure diagram of a liquid crystal display device in the prior art.
Figure 1B:
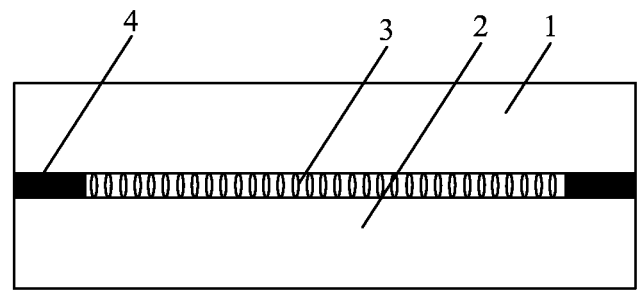
FIG. 1b is a sectional view of the liquid crystal display device of FIG. 1a in a direction A-A.
Figure 2A:
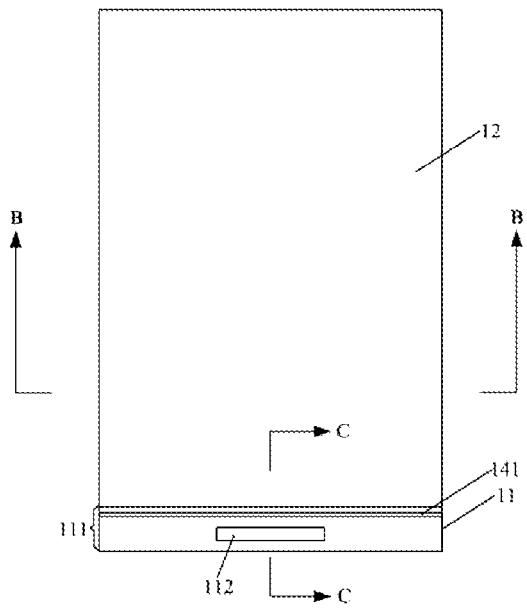
FIG. 2a is a structure diagram of a frameless display device provided by a first embodiment of the present invention.
Figure 2B:
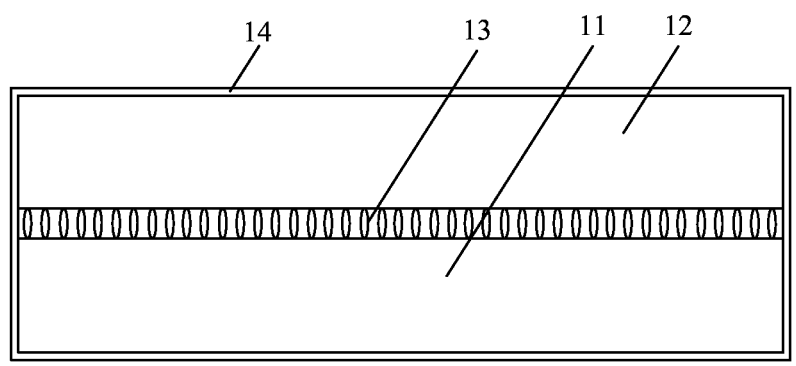
FIG. 2b is a sectional view of the frameless display device of FIG. 2a in a direction B-B.

FIG. 2a is a structure diagram of a frameless display device provided by a first embodiment of the present invention, and FIG. 2b is a sectional view of the frameless display device of FIG. 2a in a direction B-B. As shown in FIG. 2a and FIG. 2b, the frameless display device includes a first substrate 11 and a second substrate 12 which are provided opposite to each other. An edge of the first substrate 11 is coupled to an edge of the second substrate 12 to realize frame sealing without any nontransparent region.

In this embodiment, liquid crystals 13 are provided between the first substrate 11 and the second substrate 12. The liquid crystals 13 may completely cover a portion of the surface of the first substrate 11 fitted with the second substrate 12.

In this embodiment, the frameless display device further includes a transparent film 14. The transparent film 14 envelopes the first substrate 11 and the second substrate 12 so that the edge of the first substrate 11 is coupled to the edge of the second substrate 12 by the transparent film 14.

Preferably, the transparent film 14 is required to be an optical film with high flexibility, good sealing performance and high strength. In this embodiment, the transparent film 14 is a polyester film.

In this embodiment, a length of the first substrate 11 is greater than that of the second substrate 12, a circuit region 111 is provided on a side edge of the first substrate 11 in a length direction (e.g., a vertical direction in FIG. 2a), and a circuit module 112 is provided within the circuit region 111. The circuit module 112 may be an integrated circuit (IC). In this embodiment, the liquid crystals 13 may completely cover the surface of the second substrate 12 opposite to the first substrate 11.

Figure 2C:
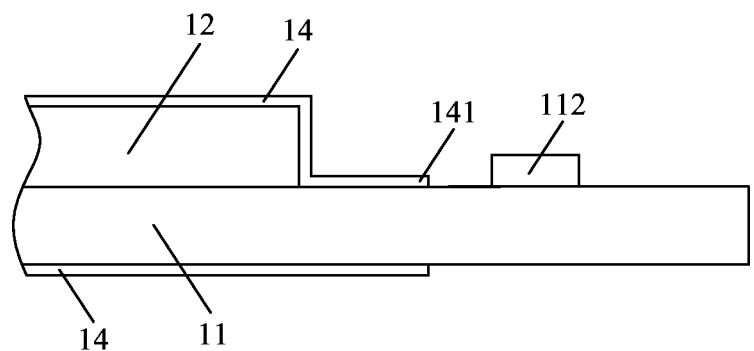
FIG. 2c is a sectional view of the frameless display device of FIG. 2a in a direction C-C.

FIG. 2c is a sectional view of the frameless display device of FIG. 2a in a direction C-C. As shown in FIG. 2a and FIG. 2c, the transparent film 14 envelops the second substrate 12, and a part of the transparent film 14 is attached to a position other than the circuit module 112 within the circuit region 111. In the circuit region 111, there is a certain distance between an edge 141 of the transparent film 14 and the circuit module 112. It is to be noted that the liquid crystal is not shown in FIG. 2c. In the circuit region 111, in order to evade the circuit module 112, the transparent film 14 only needs to envelope the second substrate 12 and extend a certain distance on the first substrate 11 in the length direction, and does not need to envelope the whole first substrate 11.

In this embodiment, the first substrate 11 may be an array substrate, and the second substrate 12 may be a color filter substrate.

In the technical solution of the frameless display device provided by the this embodiment, an edge of the first substrate is coupled to an edge of the second substrate to realize frame sealing, so that frame sealing is achieved without any frame sealing adhesive, and complete frameless display is realized. This embodiment employs a transparent film to envelope the first substrate and the second substrate, the fit between the first substrate and the second substrate may be well ensured, and the overflow of liquid crystals is well avoided. Meanwhile, in comparison to the technical solution of providing a lens above a display device to change a light path and thus to realize frameless display in the prior art, this embodiment does not need any lens and avoids unnatural display of an image on the edge of a display picture, so that the display quality of picture is improved. By enveloping the first substrate and the second substrate by using the transparent film, the display picture will not be influenced, and the display quality of picture is ensured.

Figure 3A:
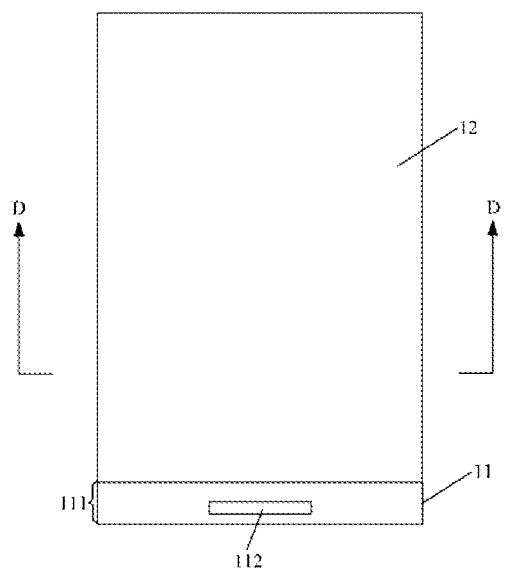
FIG. 3a is a structure diagram of a frameless display device provided by a second embodiment of the present invention.
Figure 3B:
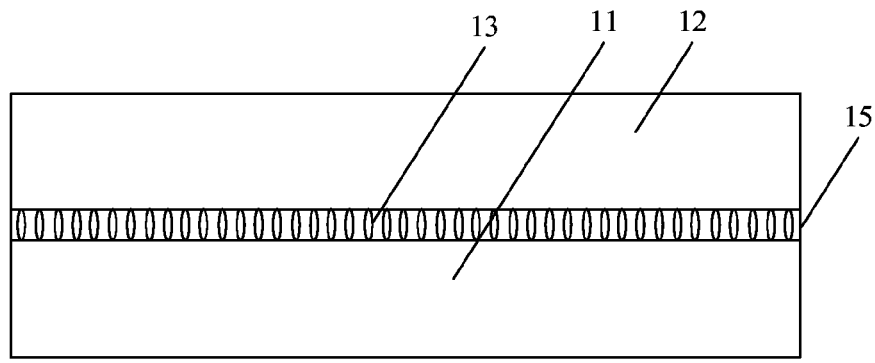
FIG. 3b is a sectional view of the frameless display device of FIG. 3a in a direction D-D.

FIG. 3a is a structure diagram of a frameless display device provided by a second embodiment of the present invention, and FIG. 3b is a sectional view of the frameless display device of FIG. 3a in a direction D-D. As shown in FIG. 3a and FIG. 3b, the frameless display device includes a first substrate 11 and a second substrate 12 which are provided opposite to each other. An edge of the first substrate 11 is coupled to an edge of the second substrate 12 to realize frame sealing without any nontransparent region.

In this embodiment, liquid crystals 13 are provided between the first substrate 11 and the second substrate 12.

In this embodiment, the edge of the first substrate 11 and the edge of the second substrate 12 are directly coupled after melting. Specifically, the first substrate 11 and the second substrate 12 are directly coupled to each other via an edge melting portion 15. For example, the edge of the first substrate and the edge of the second substrate may be melted by laser, so that the edge of the first substrate is directly coupled to the edge of the second substrate.

In this embodiment, the first substrate 11 may be an array substrate, and the second substrate 12 may be a color filter substrate.

In the technical solution of the frameless display device provided by the this embodiment, the edge of the first substrate is coupled to the edge of the second substrate to realize frame sealing without any nontransparent region, so that frame sealing is achieved without any frame sealing adhesive, and complete frameless display is realized. In comparison to the technical solution of providing a lens above a display device to change a light path and thus to realize frameless display in the prior art, this embodiment does not need any lens and avoids unnatural display of an image on the edge of a display picture, so that the display quality of picture is improved.

Figure 4:
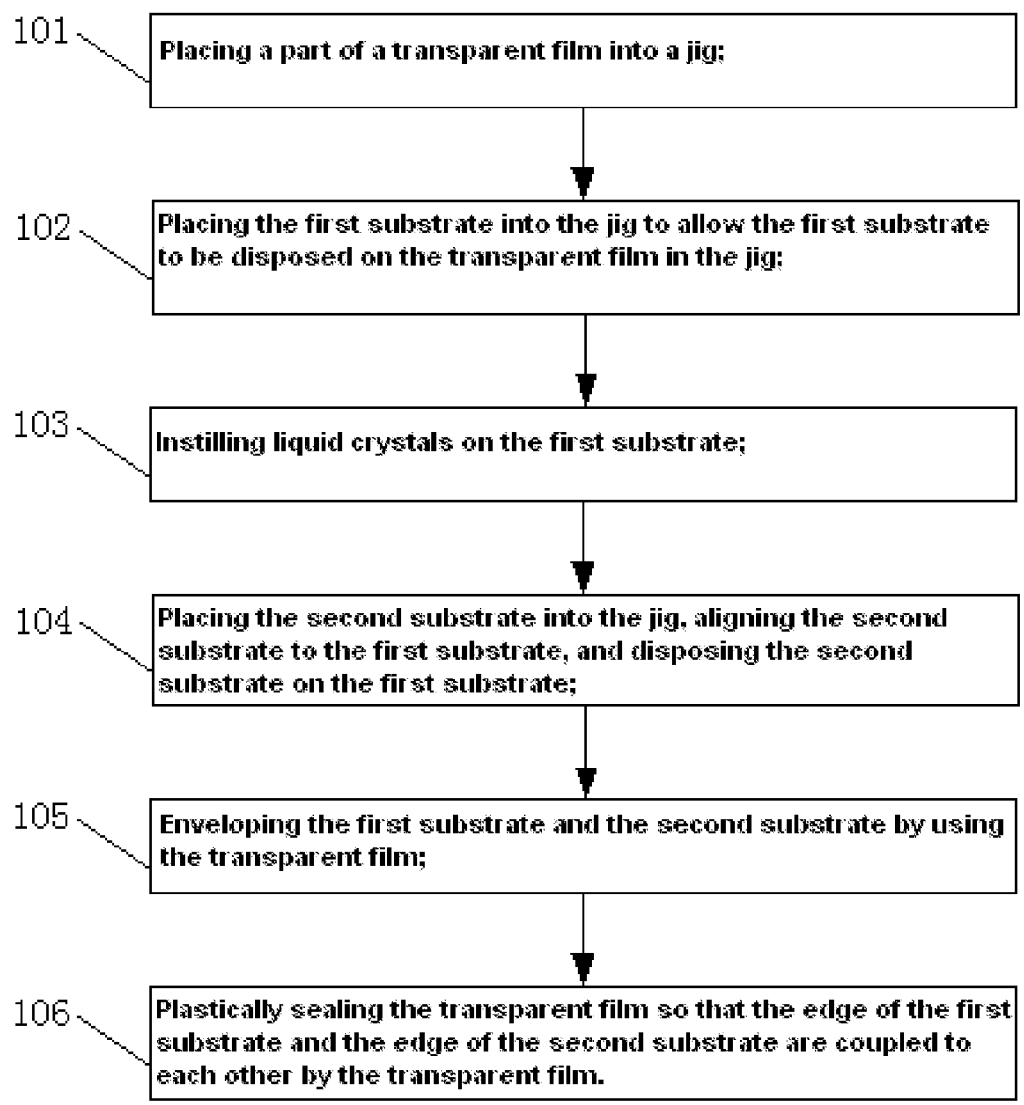
FIG. 4 is a flowchart of a method of fabricating a frameless display device provided by a third embodiment of the present invention.

A third embodiment of the present invention provides a method of fabricating a frameless display device. The method comprises: arranging a first substrate and a second substrate opposite to each other, and coupling an edge of the first substrate to an edge of the second substrate to realize frame sealing without any nontransparent region. FIG. 4 is a flowchart of the method of fabricating a frameless display device provided by the third embodiment of the present invention. As shown in FIG. 4, the method specifically comprises the following steps S101 to S106.

In step 101, a part of a transparent film is placed into a jig.

Figure 5A:
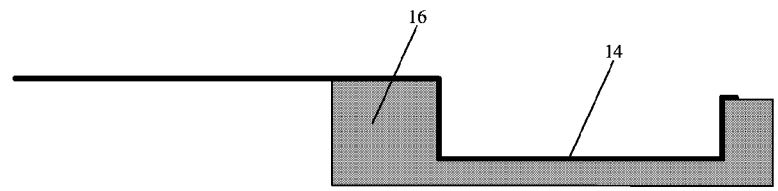
FIG. 5a is a schematic diagram of placing a transparent film in the third embodiment.

FIG. 5*a* is a schematic diagram of placing a transparent film 14 in the third embodiment. As shown in FIG. 5*a*, the transparent film 14 is configured according to a predetermined shape and size, so that the size of the transparent film 14 is slightly greater than outer surfaces of the first substrate 11 and the second substrate 12 provided opposite to each other. A part of the transparent film 14 is placed into a jig 16, while the remaining part thereof is placed outside the jig 16.

In step 102, a first substrate is placed into the jig, so that the first substrate is disposed on the transparent film in the jig.

Figure 5B:
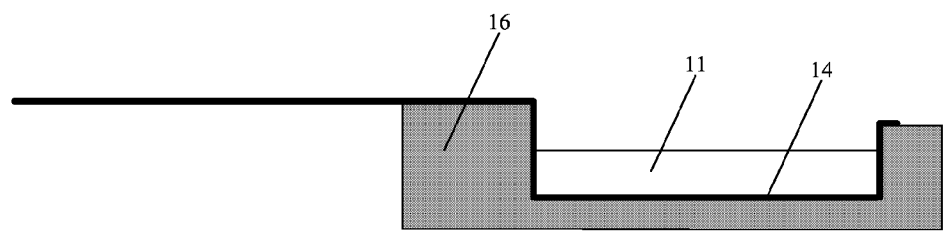
FIG. 5b is a schematic diagram of placing a first substrate in the third embodiment.

FIG. 5*b* is a schematic diagram of placing the first substrate 11 in the third embodiment. As shown in FIG. 5*b*, the first substrate 11 is placed into the jig 16, so that the first substrate 11 is provided on the transparent film 14 in the jig 16 and the first substrate 11 is in close contact with the transparent film 14 in the jig 16.

In step 103, liquid crystals are instilled on the first substrate.

Figure 5C:
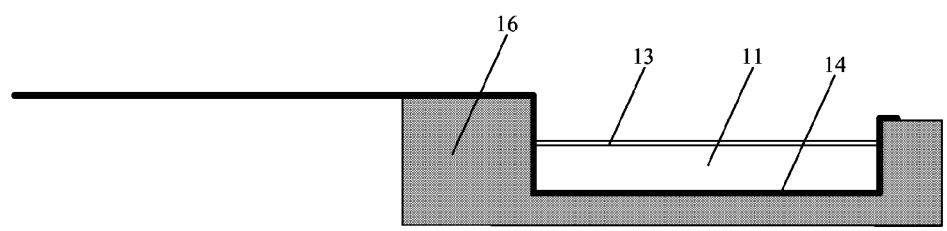
FIG. 5c is a schematic diagram of instilling liquid crystals in the third embodiment.

FIG. 5*c* is a schematic diagram of instilling the liquid crystals 13 in the third embodiment. As shown in FIG. 5*c*, the liquid crystals 13 are instilled on the first substrate 11. In this case, the liquid crystals 13 may completely cover a portion of the surface of the first substrate 11 fitted with the second substrate 12.

In step 104, a second substrate is placed into the jig, the first substrate and the second substrate are assembled to be aligned to each other, and the second substrate is disposed on the first substrate.

Figure 5D:
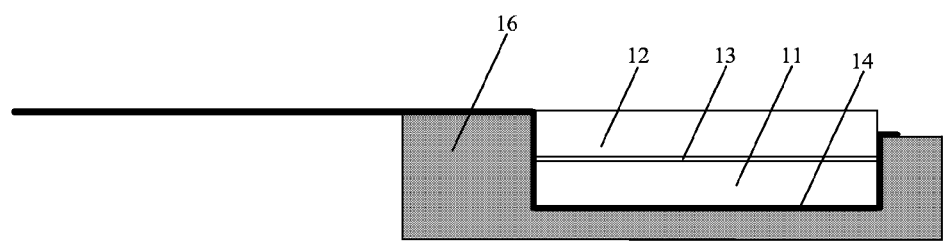
FIG. 5d is a schematic diagram of placing a second substrate in the third embodiment.

FIG. 5*d* is a schematic diagram of placing a second substrate 12 in the third embodiment. As shown in FIG. 5*d*, the second substrate 12 is placed into the jig 16, the first substrate 11 and the second substrate 12 are assembled in an alignment manner, and the second substrate 12 is disposed on the first substrate 11. The liquid crystals 13 are provided between the first substrate 11 and the second substrate 12.

In step 105, the first substrate and the second substrate are enveloped by the transparent film.

Figure 5E:
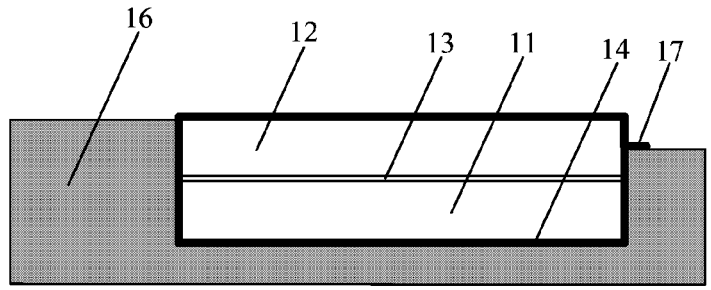
FIG. 5e is a schematic diagram of enveloping the first substrate and the second substrate by using the transparent film in the third embodiment.

FIG. 5*e* is a schematic diagram of enveloping the first substrate 11 and the second substrate 12 by using the transparent film in the third embodiment. As shown in FIG. 5*e*, the first substrate 11 and the second substrate 12 are enveloped by the transparent film 14.

In step 106, the transparent film is plastically sealed, so that the edge of the first substrate and the edge of the second substrate are coupled to each other by using the transparent film.

As shown in FIG. 5*e*, the jig 16 includes four side edges: a left side edge, a right side edge, a front side edge and a rear side edge. Each side edge corresponds to one side edge of each of the first substrate 11 and the second substrate 12 provided opposite to each other. One side edge (e.g., the left side edge in FIG. 5*e*) of the jig 16 is higher than other three side edges, and the tops of the other three side edges correspond to the second substrate 12. A plastic seal 17 during plastic sealing is provided on a side edge of the second substrate 12.

As shown in FIG. 2*a* and FIG. 2*c*, a length of the first substrate 11 is greater than that of the second substrate 12, a circuit region 111 is provided on a side edge of the first substrate 11 in a length direction, and a circuit module 112 is provided within the circuit region 111.

The method may further comprise enveloping the second substrate 12 by using the transparent film 14 and attaching a part of the transparent film 14 to a position other than the circuit module 112 within the circuit region 111. Preferably, the attaching process may be performed before plastically sealing the transparent film 14.

Preferably, after the attaching process and before plastically sealing the transparent film 14, the method may further comprise vacuumizing a gap between the transparent film 14 and the substrates 11, 12.

Step 106 may specifically comprise plastically sealing the transparent film 14 corresponding to a side edge with a smaller height and without the circuit region 111 disposed thereon. In other words, it is not required to plastically seal the transparent film 14 corresponding to the highest side edge (e.g., the left side edge in FIG. 5*e*) and the side edge where the circuit region 111 is provided, but the transparent film 14 corresponding to two side edges with a smaller height is required to be plastically sealed.

Further, the method may further comprise removing a plastic seal 17, and taking the plastically sealed first substrate 11 and second substrate 12 out of the jig 16 so as to obtain the frameless display device.

The method of fabricating a frameless display device provided by this embodiment may be used for fabricating the frameless display device provided by the first embodiment.

In the technical solution of the method of fabricating the frameless display device provided by the this embodiment, an edge of the first substrate is coupled to an edge of the second substrate to realize frame sealing without any nontransparent region, so that frame sealing is achieved without any frame sealing adhesive, and complete frameless display is realized. This embodiment employs a transparent film to envelope the first substrate and the second substrate, the fit between the first substrate and the second substrate may be well ensured, and the overflow of liquid crystal is well avoided. Meanwhile, in comparison to the technical solution of providing a lens above a display device to change a light path and thus to realize frameless display in the prior art, this embodiment does not need any lens and avoids unnatural display of an image on the edge of a display picture, so that the display quality of picture is improved. By enveloping the first substrate and the second substrate by using the transparent film, the display picture will not be influenced, and the display quality of picture is ensured.

Figure 6:
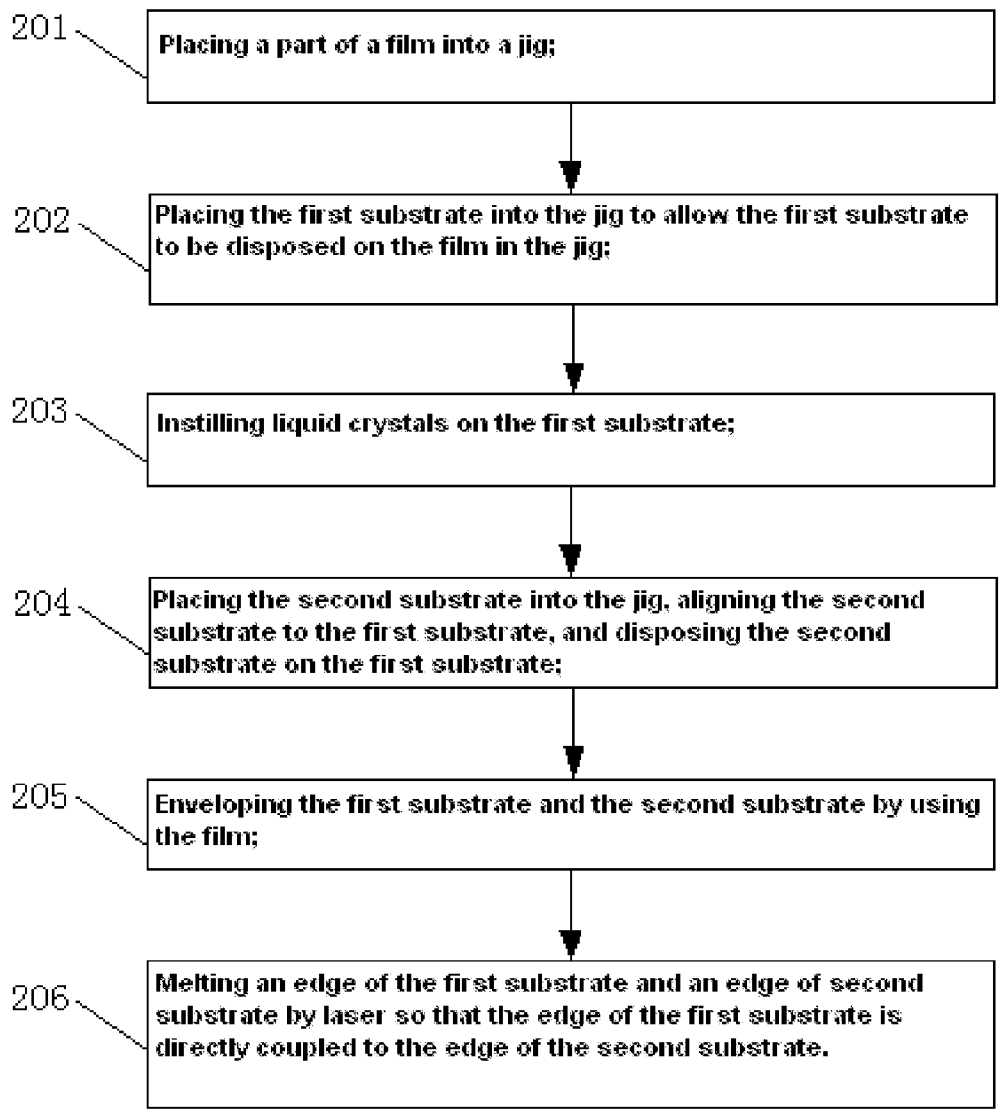
FIG. 6 is a flowchart of a method of fabricating a frameless display device provided by a fourth embodiment of the present invention.

A fourth embodiment of the present invention provides another method of fabricating a frameless display device. The method comprise arranging a first substrate and a second substrate opposite to each other, and coupling an edge of the first substrate to an edge of the second substrate to realize frame sealing without any nontransparent region. FIG. 6 is a flowchart of the method of fabricating a frameless display device provided by the fourth embodiment of the present invention. As shown in FIG. 6, the method specifically comprises the following steps S201 to S207.

In step 201, a part of a film is placed into a jig.

For the description of step 201, reference may be made to the description of step 101, and it will not be repeated here.

In step 202, a first substrate is placed into the jig so that the first substrate is provided above the film in the jig.

For the description of step 202, reference may be made to the description of step 102, and it will not be repeated here.

In step 203, liquid crystals are instilled on the first substrate.

For the description of step 203, reference may be made to the description of step 103, and it will not be repeated here.

In step 204, a second substrate is placed into the jig, the first substrate and the second substrate are assembled to be aligned to each other, and the second substrate is disposed on the first substrate.

For the description of step 204, reference may be made to the description of step 104, and it will not be repeated here.

In step 205, the first substrate and the second substrate are enveloped by the film.

For the description of step 205, reference may be made to the description of step 105, and it will not be repeated here.

It is to be noted that, during executing steps 201 to 205, since the film mainly functions to avoid the overflow of the liquid crystal 13 before step 206 and the film will be removed in a subsequent step, the film in this embodiment may be a nontransparent film or a transparent film, and is not necessarily the transparent film 14 in the first embodiment.

In step 206, an edge of the first substrate and an edge of the second substrate are melted by laser, so that the edge of the first substrate is directly coupled to the edge of the second substrate.

During melting, the film on the edge of the first substrate 11 and on the edge of the second substrate may be first removed by laser.

In step 207, the film is removed.

Specifically, the film is removed from the first substrate 11 and the second substrate 12 to form the frameless display device in FIG. 3a and FIG. 3b.

Before step 207, it is required to take the first substrate 11 and the second substrate 12 out of the jig 16 after step 206.

It is to be noted that, when the film is a nontransparent film, step 207 is necessary; however, when the film is a transparent film, step 207 is unnecessary.

The method of fabricating a frameless display device provided by this embodiment may be used for fabricating the frameless display device provided by the above second embodiment.

In the technical solution of the method of fabricating a frameless display device provided by the this embodiment, an edge of the first substrate is coupled to an edge of the second substrate to realize frame sealing, so that frame sealing is achieved without any frame sealing adhesive, and complete frameless display is realized. In comparison to the technical solution of providing a lens above a display device to change a light path and thus to realize frameless display in the prior art, this embodiment does not need any lens and avoids unnatural display of an image on the edge of a display picture, so that the display quality of picture is improved.

It should be understood that the foregoing implementations are merely exemplary implementations used for describing the principle of the present invention, but the present invention is not limited thereto. A person of ordinary skill in the art may make various modifications and improvements without departing from the spirit and essence of the present invention, and those modifications and improvements shall fall into the protection scope of the present invention.

The invention claimed is:

1. A method of fabricating a frameless display device, comprising steps of:
 arranging a first substrate and a second substrate opposite to each other, and coupling an edge of the first substrate to an edge of the second substrate to realize frame sealing without any nontransparent region, wherein the steps of arranging a first substrate and a second substrate opposite to each other, and coupling an edge of the first substrate to an edge of the second substrate to realize frame sealing comprise steps of:
 placing a part of a transparent film into a jig;
 placing the first substrate into the jig to allow the first substrate to be disposed on the transparent film in the jig;
 instilling liquid crystals on the first substrate;
 placing the second substrate into the jig, aligning the second substrate to the first substrate, and disposing the second substrate on the first substrate;
 enveloping the first substrate and the second substrate by using the transparent film; and
 plastically sealing the transparent film so that the edge of the first substrate and the edge of the second substrate are coupled to each other by the transparent film.

2. The method according to claim 1, wherein the jig comprises four side edges, one side edge is higher than other three side edges, the tops of the other three side edges correspond to the second substrate, and a plastic seal during plastic sealing is located on a side edge of the second substrate.

3. The method according to claim 2, wherein a length of the first substrate is greater than that of the second substrate, a circuit region is provided on a side edge of the first substrate in a length direction, and a circuit module is provided within the circuit region; and
 the method further comprises a step of:
 enveloping the second substrate by using the transparent film and partially attaching the transparent film to a position other than the circuit module within the circuit region.

4. The method according to claim 3, wherein the step of enveloping the second substrate by using the transparent film and partially attaching the transparent film to a position other than the circuit module within the circuit region comprises:
 plastically sealing the transparent film corresponding to a side edge with a smaller height and without the circuit region disposed thereon.

5. The method according to claim 4, further comprising:
 removing a plastic seal formed by the plastic sealing.

6. A method of fabricating a frameless display device, comprising steps of:
 arranging a first substrate and a second substrate opposite to each other, and coupling an edge of the first substrate to an edge of the second substrate to realize frame sealing without any nontransparent region, wherein the steps of arranging a first substrate and a second substrate opposite to each other, and coupling an edge of the first substrate to an edge of the second substrate to realize frame sealing comprise steps of:

placing a part of a film into a jig;

placing the first substrate into the jig to allow the first substrate to be disposed on the film in the jig;

instilling liquid crystals on the first substrate;

placing the second substrate into the jig, aligning the second substrate to the first substrate, and disposing the second substrate on the first substrate;

enveloping the first substrate and the second substrate by using the film; and melting an edge of the first substrate and an edge of second substrate by laser so that the edge of the first substrate is directly coupled to the edge of the second substrate.

7. The method according to claim 6, further comprising:

removing the film, in the case where the film is a nontransparent film.

\* \* \* \* \*